Feb. 16, 1926.

A. M. STOCK ET AL 1,573,426

INTERLOCKING NUT AND BOLT

Filed April 9, 1925

Inventor:
Augusta M. Stock
Robert Stock

Patented Feb. 16, 1926.

1,573,426

UNITED STATES PATENT OFFICE.

AUGUSTA M. STOCK AND ROBERT STOCK, OF CLEVELAND, OHIO.

INTERLOCKING NUT AND BOLT.

Application filed April 9, 1925. Serial No. 21,987.

*To all whom it may concern:*

Be it known that AUGUSTA M. STOCK, a citizen of the United States, residing at Cleveland, in the county of Cuyahoga and State of Ohio, and ROBERT STOCK, a citizen of the United States, residing at Cleveland, in the county of Cuyahoga and State of Ohio, have invented certain new and useful Improvements in Interlocking Nuts and Bolts, of which the following is a specification.

This invention relates to lock nuts. An object of this invention is to provide an improved lock nut and bolt and especially to provide an improved lock nut which will be of simple construction, which will be easily fabricated and which will be certain in its operation. A further object of this invention is to provide a lock nut of easy assembly, which will save labor, which will provide absolute mechanical joints, and which is quick of installation and reliable in its operation. A further object of this invention is to provide a lock nut of an interlocking type which cannot be loosened by vibration. A further object of this invention is to provide a device of this character which can be used on either straight or tapered bolts and which may be used with cap or open nuts. A further object of this invention is to provide a device of this character which may be used either with or without washer means.

With the foregoing and other objects in view, we have invented the device shown in the accompanying drawings in which—

Figure 1:
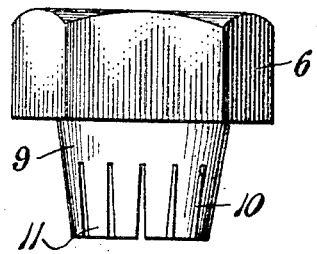
Fig. 1 is a side elevation, partly broken away of my nut lock shown in unlocked position.
Figure 1:
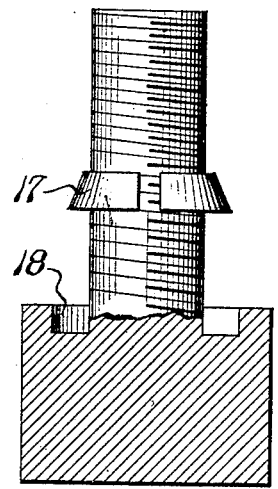
Figure 2:
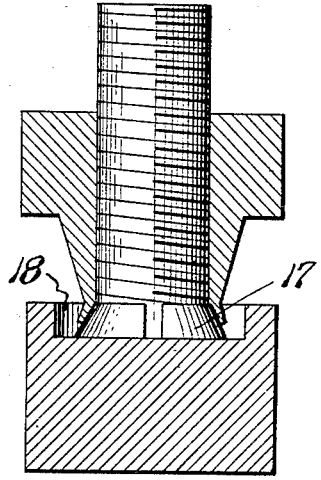
Fig. 2 is a section of the device shown in Fig. 1 with the taper washer in a different position.

Like reference characters indicate like parts throughout the views and in the specification, in which there is a nut 6, provided with a tapered reduced extension at 9 preferably slotted 10, which may be one or more slots depending upon the size of the bolt and other conditions. The interior portion of the extension 9 is preferably longitudinally corrugated or serrated as at 11, the serrations preferably extending to the beginning of the threads. A tapered split washer 17 is adapted to fit in the undercut portion 18 of the bolt.

In the operation of this device the nut is threaded on to the bolt so that the yielding extension 9 comes into contact with the tapered washer—thus spreading this extension into binding engagement with the walls of the undercut portion of the bolt.

Although we have herein shown and described only one form of nut lock embodying our invention, it is to be understood that various changes and modifications may be made therein without departing from the spirit of the invention.

Having thus described our invention, that which we claim as new and desire to secure by Letters Patent is:

1. In combination, a bolt provided with an undercut head, a movable taper washer mounted upon the bolt and adapted to fit within the undercut portion and a nut provided with a yielding extension adapted to be forced by the taper member against the undercut portion of the head.

2. In combination with a bolt, a split taper washer carried by the bolt, the bolt provided with a recess for the taper washer and with a nut adapted to be spread by the taper washer and to engage the recess.

In testimony whereof we affix our signatures.

AUGUSTA M. STOCK.
ROBERT STOCK.